(12) United States Patent
Bauer

(10) Patent No.: US 11,913,500 B2
(45) Date of Patent: Feb. 27, 2024

(54) CLUTCH ARRANGEMENT

(71) Applicant: ZF FRIEDRICHSHAFEN AG, Friedrichshafen (DE)

(72) Inventor: Thomas Bauer, Großbardorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 499 days.

(21) Appl. No.: 17/278,777

(22) PCT Filed: Sep. 23, 2019

(86) PCT No.: PCT/EP2019/075550
§ 371 (c)(1),
(2) Date: Mar. 23, 2021

(87) PCT Pub. No.: WO2020/064644
PCT Pub. Date: Apr. 2, 2020

(65) Prior Publication Data
US 2022/0034368 A1    Feb. 3, 2022

(30) Foreign Application Priority Data
Sep. 24, 2018   (DE) .................... 10 2018 216 204.2

(51) Int. Cl.
| H02K 7/108 | (2006.01) |
| F16D 1/076 | (2006.01) |
| F16D 13/68 | (2006.01) |
| F16D 13/76 | (2006.01) |
| F16D 33/00 | (2006.01) |

(Continued)

(52) U.S. Cl.
CPC ........... *F16D 1/076* (2013.01); *F16D 13/683* (2013.01); *F16D 13/76* (2013.01); *H02K 7/108* (2013.01); *B60K 2006/4825* (2013.01); *F16D 33/00* (2013.01); *F16D 2001/103* (2013.01)

(58) Field of Classification Search
CPC ... F16D 1/076; F16D 2001/103; H02K 7/108; B60K 2006/4825
See application file for complete search history.

(56) References Cited

U.S. PATENT DOCUMENTS

| 6,092,985 A | * | 7/2000 | Winkam | ................ B60K 6/485 |
| | | | | 415/213.1 |
| 6,340,339 B1 | * | 1/2002 | Tabata | ................... B60K 6/387 |
| | | | | 475/5 |

(Continued)

FOREIGN PATENT DOCUMENTS

| DE | 10221625 | 10/2003 | | |
| DE | 19964504 A1 | * 4/2007 | ............... B60K 6/26 |

(Continued)

*Primary Examiner* — Stacey A Fluhart
(74) *Attorney, Agent, or Firm* — Cozen O'Connor

(57) ABSTRACT

A clutch arrangement is provided with a clutch housing that connects a drive unit to an output, such as a transmission, which is rotatable around a central axis and with which an axial central projection is associated at the side of the clutch housing facing the drive unit in the radial extension area of its rotational center. The axial central projection receives a rotor carrier receiving a rotor of an electric machine. The central projection is connected at least so as to be fixed with respect to relative rotation to the drive unit via a first connection device and to the rotor carrier via a second connection device.

18 Claims, 3 Drawing Sheets

(51) Int. Cl.
F16D 1/10 (2006.01)
B60K 6/48 (2007.10)

(56) References Cited

U.S. PATENT DOCUMENTS

| | | | |
|---|---|---|---|
| 6,478,101 B1 | 11/2002 | Taniguchi et al. | |
| 8,997,956 B2 * | 4/2015 | Iwase | F16H 45/02 |
| | | | 192/3.3 |
| 10,995,802 B2 * | 5/2021 | Lehmann | F16D 48/062 |
| 11,505,056 B2 * | 11/2022 | Ramsey | H02K 7/006 |
| 2008/0023287 A1 * | 1/2008 | Thiede | B60L 50/16 |
| | | | 192/48.1 |
| 2010/0062899 A1 * | 3/2010 | Engelmann | F16D 25/0638 |
| | | | 903/914 |
| 2010/0105518 A1 | 4/2010 | Kasuya et al. | |

FOREIGN PATENT DOCUMENTS

| | | |
|---|---|---|
| DE | 102009038198 | 3/2010 |
| DE | 102016014725 | 6/2018 |
| WO | WO 2019076530 | 4/2019 |

\* cited by examiner

CLUTCH ARRANGEMENT

CROSS REFERENCE TO RELATED APPLICATIONS

This is a U.S. national stage of Application No. PCT/EP2019/075550 filed Sep. 23, 2019. Priority is claimed on German Application No. DE 10 2018 216 204.2 filed Sep. 24, 2018 the content of which is incorporated herein by reference.

BACKGROUND OF THE INVENTION

1. Field of the Invention

The disclosure is directed to a clutch arrangement with a clutch housing that connects a drive unit which comprises, for example, an internal combustion engine, to an output such as a transmission. The clutch housing is rotatable around a central axis and with which an axial central projection is associated at a side of the clutch housing facing the drive unit in the radial extension area of its rotational center, which axial central projection serves to receive a rotor carrier receiving a rotor of an electric machine.

2. Description of Related Art

A clutch arrangement of this type is known from DE 10 2016 014 725 A1. The rotor carrier and, therefore, the rotor of an electric machine is received by fastening elements that are part of a detachable connection unit of a fastening device at the clutch arrangement formed as a hydrodynamic torque converter. A compact axial construction can be achieved for the clutch arrangement particularly when the rotor extends in direction of the clutch housing proceeding from the rotor carrier and accordingly at least partially axially overlaps the clutch housing. However, a noticeable disadvantage is that the rotor carrier almost completely covers the clutch housing at a side thereof facing the drive and therefore precludes the possibility of connecting the clutch housing directly to the drive in a simple manner.

SUMMARY OF THE INVENTION

It is an object of one aspect of the invention to form a clutch arrangement in such a way that it can be connected directly to a drive in a simple manner in a compact axial construction.

One object of the invention is a clutch arrangement with a clutch housing that connects a drive unit, with which, for example, an internal combustion engine is associated, to an output such as a transmission, which clutch housing is rotatable around a central axis and which has, at the side thereof facing the drive in the radial extension area of its rotational center, an axial central projection which serves to receive a rotor carrier receiving a rotor of an electric machine.

It is particularly relevant that the central projection is connected at least to be fixed with respect to relative rotation to a drive unit associated with the drive via a first connection device and to the rotor carrier via a second connection device.

By producing a rotationally fixed connection between the central projection and the drive unit on the one hand and between the central projection and the rotor carrier on the other hand, a movement of the drive unit, which can comprise, for example, a torsional vibration damper and/or a mass damper system, can be transmitted to the central projection by the first connection device and from the central projection to the rotor carrier by the second connection device in a very spatially compact construction. If the central projection is fixed to rotate with the clutch housing by a fastening device, two machines can be connected to the clutch housing to be fixed with respect to rotation relative to it in an extremely small installation space, namely, an internal combustion engine via the drive unit on the one hand and an electric machine via the rotor carrier on the other hand.

To the extent that at least one of the connection devices and the fastening device have connection elements, which are preferably detachable and the connection device provided between the drive unit and the central projection is also formed to be detachable, each of the at least rotationally fixed connections produced by these connection devices and fastening devices can, if required, be disconnected again at any time without damaging or even destroying the coupling arrangement.

In an advantageous configuration, the connection device provided between the drive unit and the central projection can be provided with toothings, particularly with radial toothings, both at the central projection and at the torsional vibration damper. The toothings, which act as plug-in connection, are brought into operative connection with one another by a predetermined relative movement of drive unit and central projection with respect to one another. In the case of radial toothings, mentioned above, it is sufficient to displace drive unit and central projection relative to one another in axial direction, for example, by fitting a component part of the drive unit to the central projection.

To facilitate a problem-free fastening of the central projection to the clutch housing, the central projection has a radially outwardly extending fastening flange fastened to the clutch housing by preferably detachable connection elements of the fastening device. At the side of the fastening flange remote of the clutch housing, the central projection is provided with a support device for the rotor carrier which has at least one support for the rotor carrier as well as at least one receptacle for at least one preferably detachable connection element of the second fastening device.

With regard to the radially outwardly extending fastening flange of the central projection, this fastening flange can receive the rotor carrier either axially between itself and the clutch housing or at its side remote of the clutch housing. A very axially compact construction results in the former case, while a more problem-free assembly results in the latter case. In this respect, it is especially advantageous when the radially outwardly extending fastening flange of the central projection in those circumferential regions in which it engages at the clutch housing via connection elements of the fastening device projects farther radially outward, encompassing these connection elements, than in circumferential regions between two respective connection elements. Ideally, this results in an at least substantially undulating outer contour for the radially outwardly extending fastening flange of the central projection in the radial circumferential region thereof. This undulating outer contour promotes an axially elastic behavior of the fastening flange, which in turn allows a decoupling of the clutch housing in axial direction from vibrations that are generated by a drive.

The central projection is advantageously provided at the side of the fastening flange remote of the clutch housing with a support device for the rotor carrier which has at least one support for the rotor carrier and at least one receptacle for at least one connection element of the second fastening device.

The support device for the rotor carrier particularly preferably takes the form of braces which are provided at the side of the radially outwardly extending fastening flange of the central projection remote of the clutch housing and which extend at least substantially radially outward proceeding from a hub of the central projection. The braces run into the hub of the central projection with their radially inner end, respectively, and surround at least one receptacle for at least one connection element of the second fastening device with their radially outer end, respectively.

It may be stated with respect to the rotor carrier that this rotor carrier has a plurality of recesses in circumferential direction at least at its side remote of the clutch housing. Various advantages can be achieved in this way such as an encoder for a rotational movement, cooling air supply, and/or weight reduction by economizing on material.

In a particularly preferable manner, the clutch arrangement is arranged in a receptacle space of a transmission housing, which is separated from a further space of the transmission by a cover. The central projection of the coupling arrangement can be centered relative to this cover by a bearing device so that the clutch arrangement can execute rotations inside of the transmission around the longitudinal axis thereof, the central axis of the clutch arrangement preferably coinciding with the longitudinal axis of the transmission housing. In addition, the central projection can be sealed relative to the cover by a sealing device. Owing to this seal, in accordance with the respective fill level of the transmission housing, the clutch arrangement is located in a moist space in which a fluid mist is preferably contained or in a wet space that can be completely filled with fluid. In contrast, the drive unit can be arranged outside of the receptacle space defined by the cover and, therefore, inside of the further space mentioned above. To the extent that this further space does without wetting by fluid mist or filling with fluid, it is formed as dry space.

The drive unit can comprise a torsional vibration damper and/or a mass damper system. Alternatively or additionally, the clutch housing can also comprise a torsional vibration damper and/or a mass damper system. The torsional vibration damper and/or mass damper system would be contained in the dry space in the former case and in the moist space or wet space in the latter case.

DETAILED DESCRIPTION OF THE PRESENTLY PREFERRED EMBODIMENTS

Figure 1:
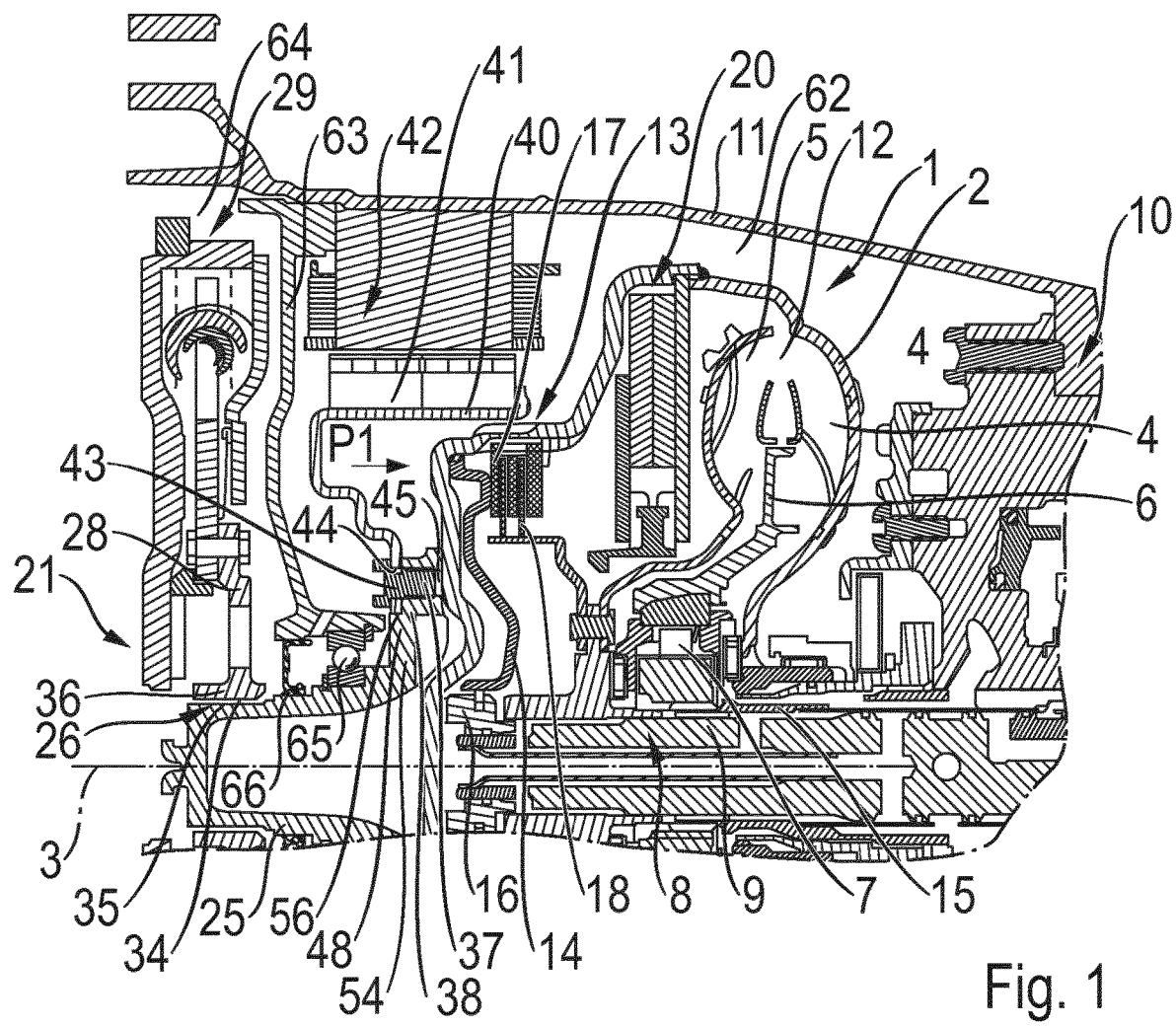
FIG. 1 is a clutch arrangement with a clutch housing that connects a drive unit to an output and with which an axial central projection is associated at the side of the clutch housing facing the drive unit in the radial extension area of its rotational center, which axial central projection serves to receive a rotor carrier receiving a rotor of an electric machine.

In the drivetrain depicted in FIG. 1, the clutch arrangement 1 is formed as hydrodynamic torque converter. The clutch arrangement 1 has a clutch housing 2, which can carry out rotational movements around a central axis 3. In that it receives impeller vanes, the clutch housing 2 acts as an impeller 4 cooperating with a turbine 5, which is connected for co-rotation to an output 8 formed by a transmission input shaft 9 of a transmission 10. Axially between the impeller 4 and the turbine 5, a stator 6 is positioned on a freewheel 7, which is received at least in rotational direction at a supporting shaft 15, which encompasses the transmission input shaft 9 of the transmission 10. The impeller 4, the turbine 5 and the stator 6 form a hydrodynamic circuit 12 which can be bypassed by a clutch mechanism 13 in that the movement of the clutch housing 2 is guided to the output 8 while bypassing the hydrodynamic circuit 12. To this end, the clutch mechanism 13 must be engaged, for which purpose a piston 14, which is axially displaceably arranged on a clutch housing hub 16 is moved in a direction in which it brings drive-side clutch elements 17, which are fixed with respect to rotation to the clutch housing 2 into operative connection with output-side clutch elements 18, which are fixed with respect to rotation to the turbine 5 and therefore to the output 8. For disengaging, the piston 14 is displaced in the opposite axial direction and accordingly dissolves the operative connection between the clutch elements 17 and 18. Finally, the clutch housing 2, which is received in a transmission housing 11 of the transmission 10 receives a mass damper system 20 by which excitations of a drive unit 21 having a torsional vibration damper 29 can be eliminated.

An axial central projection 25 which protrudes in direction of the drive unit 21 and symmetrically surrounds the central axis 3 is provided at the side of the clutch housing 2 facing the drive unit 21. The central projection 25 is connected via a first connection device 26 to an output flange 28 of the torsional vibration damper 29 of the drive unit 21. The first connection device 26 has radial toothings 34, 35. The one radial toothing 34 is provided at the radial inner side of a flange foot 36 of the output flange 28 of the torsional vibration damper 29, and the other radial toothing 35 is provided at the radial outer side of the central projection 25. The two radial toothings 34 and 35 can be brought into or out of operative connection with each other by axial displacement of the output flange 28 of the torsional vibration damper 29 and central projection 25. In this way, the radial toothings 34 and 35 form detachable connection elements 31 and 32 of the first connection device 26.

Figure 2:
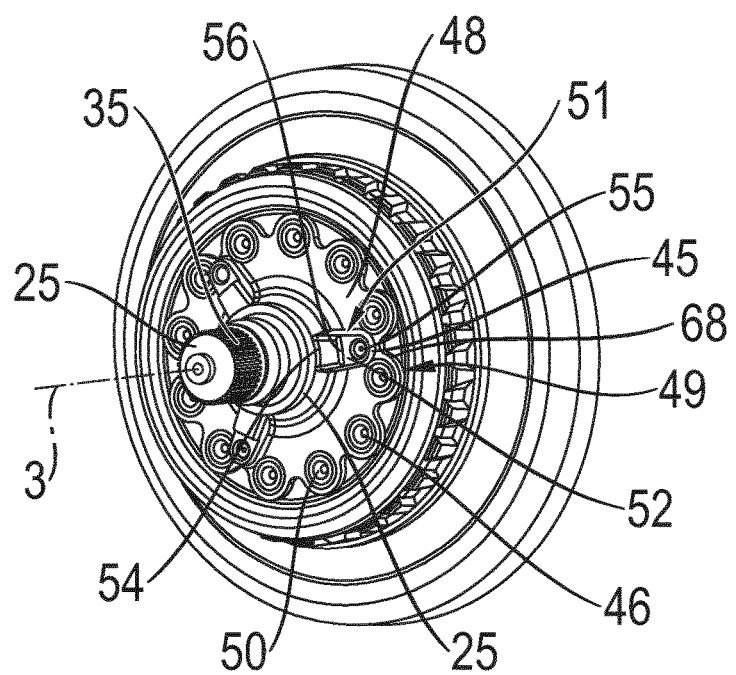
FIG. 2 is the clutch housing and the axial central projection from the viewing direction of arrow P1 in FIG. 1.

The central projection 25 is connected via a second connection device 38 to a rotor carrier 40 of a rotor 41 of an electric machine 42 so as to be fixed with respect to rotation relative to it. Detachable connection elements 43 in the form of screws 37 are provided for forming the connection device 38. The connection elements 43 penetrate recesses 44 in the rotor carrier 40 proceeding from the side of the drive unit 21 and are screwed into threaded recesses 45 which, as can be seen from FIG. 2, are provided in receptacles 55 of supports 52 of a support device 51 for the rotor carrier 40. The support device 51 for the rotor carrier 40 is provided at a radially outwardly extending fastening flange 48 of the central projection 45 at the side remote of the clutch housing 2 and receives the supports 52 for the rotor carrier 40 at uniform angular intervals relative to one another. Proceeding from a hub 54 of the central projection 25, the supports 52 extend at least substantially radially outward and, with their radially outward end, respectively, form a receptacle 55 for at least one preferably detachable connection element 43 of the second connection device 38 in the form of screws 37. Each support 52 has in the radial region between the hub 54 of the central projection 25 and the receptacle 55 a centering edge 56 for the rotor carrier 40 at which the rotor carrier 40 can be radially supported.

As is shown in FIG. 2, the radially outwardly extending fastening flange 48 of the central projection 25 is fixedly connected to the clutch housing 2 via a fastening device 49 with connection elements 46 in the form of rivets 50. The fastening flange 48 of the central projection 25 in those circumferential regions in which it engages at the clutch housing 2 via connection elements 46 of the fastening device 49 projects farther radially outward, encompassing these connection elements 46, than in circumferential regions between two respective connection elements 46. Accordingly, the fastening flange 48 of the central projection 25 has an at least substantially undulating outer contour 68 in its radial circumferential region.

Figure 3:
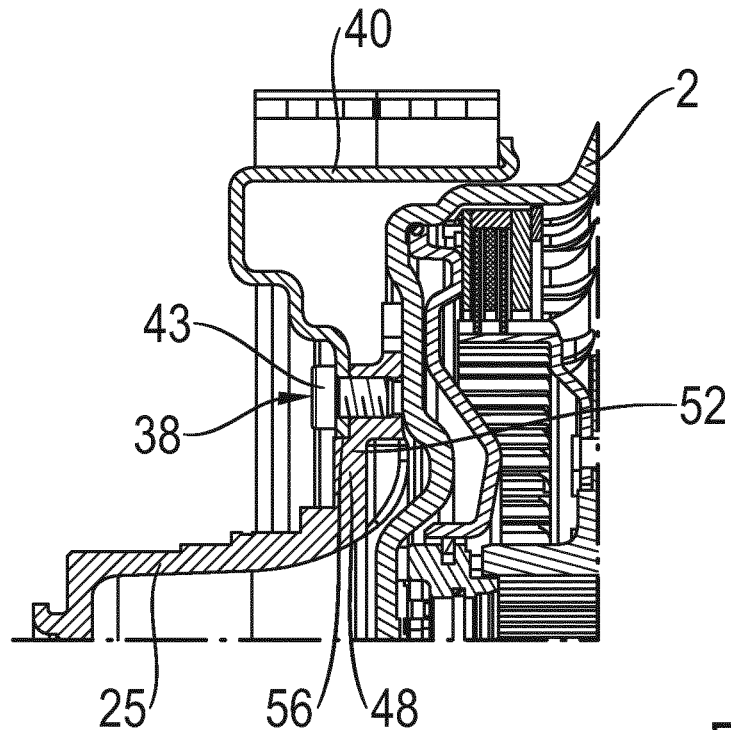
FIG. 3 is a detail of the axial central projection of FIG. 1 with the rotor carrier for the rotor of an electric machine arranged at the side of the central projection remote of the clutch housing.

In the arrangement depicted in FIG. 1, the rotor carrier 40 is received axially at the side of the radially outwardly extending fastening flange 48 of the central projection 25 remote of the clutch housing 2 and, after radial support thereof at the centering edges 56 of the supports 52, is axially fastened to the fastening flange 48 of the central projection 25 by the connection elements 43 of the second connection device 38. An arrangement of this kind is also shown in FIG. 3.

Figure 4:
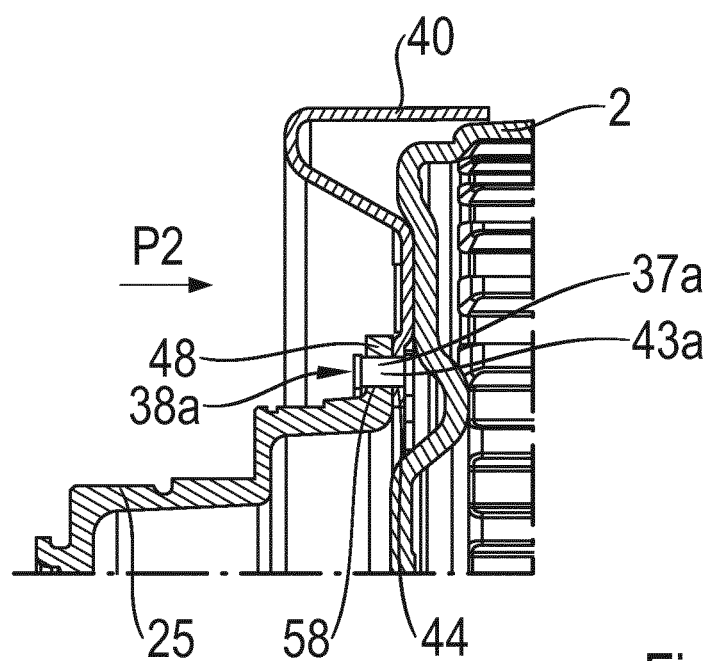
FIG. 4 is a detail of the axial central projection of FIG. 1 with the rotor carrier for the rotor of an electric machine arranged axially between the central projection and the clutch housing.

The arrangement shown in FIG. 4 in which the rotor carrier 40 is received axially between the radially outwardly extending fastening flange 48 of the central projection 25 and the clutch housing 2 can be formed in an axially compact manner. In this construction, the second connection device 38a is provided with connection elements 43a in the form of rivets 37a, which penetrate recesses 44 in the rotor carrier 40 as well as recesses 58 in the fastening flange 48 of the central projection 25. As will be appreciated from FIG. 5, the fastening flange 48 of the central projection 25 in this arrangement is formed without supports for a support device for the rotor carrier 40. Accordingly, the rivets 37a of the second connection device 38a carry out not only the axial connection of the rotor carrier 40 to the fastening flange 48 of the central projection 25 but also the centering.

Figure 5:
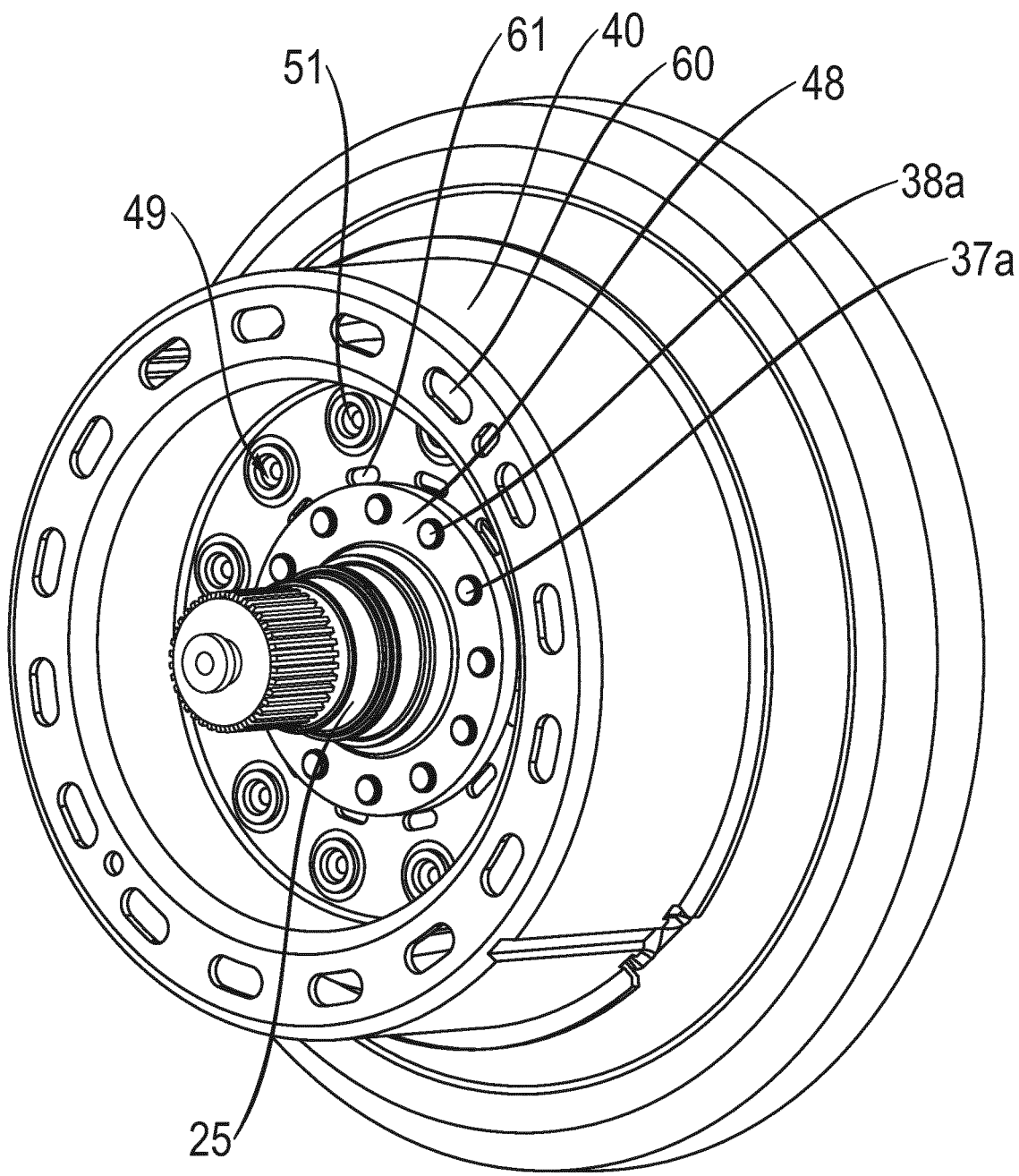
FIG. 5 is the axial central projection and the rotor carrier for the rotor of an electric machine from FIG. 4 in the viewing direction of arrow P2 in FIG. 4.

As will further be seen from FIG. 5, the rotor carrier 40 has a plurality of recess 60, 61 in circumferential direction at its side remote of the clutch housing 2. Various advantages can be achieved in this way such as an encoder for a rotational movement, cooling air supply and/or weight reduction by economizing on material. Recesses 60 can be formed in the circumferential region of the respective connection element 51 of the fastening device 49 radially outwardly of the connection element 51, whereas recesses 61 can be formed radially inwardly thereof.

As in shown in FIG. 1, the clutch arrangement 1 is arranged in a clutch space 62 of the transmission housing 11 of the transmission 10, this clutch space 62 being separated from a damper space 64 receiving the torsional vibration damper 29 by a cover 63 of the transmission housing 11. The cover 63 receives a bearing 65 and a sealing device 66 at its radially inner end. The bearing 65 serves to center the central projection 25 of the clutch arrangement 1, while the sealing device 66 seals the clutch space 62 relative to the damper space 64. Accordingly, for example, the clutch space 62 can contain a fluid or merely a fluid mist, while the damper space 64 is dry.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch arrangement comprising:
a clutch housing configured to connect a drive unit to an output, the clutch housing is rotatable around a central axis;
an axial central projection arranged at a side of the clutch housing facing the drive unit in a radial extension area of clutch housing's rotational center;
a rotor carrier receiving a rotor of an electric machine received by the axial central projection;
a first connector that connects the axial central projection, at least to be fixed with respect to relative rotation, to the drive unit; and
a second connector that connects the axial central projection to the rotor carrier,
wherein the axial central projection comprises a radially outwardly extending fastening flange that connects the axial central projection to the clutch housing by connection elements of a fastening device,
wherein the radially outwardly extending fastening flange of the axial central projection in circumferential regions in which the radially outwardly extending fastening flange engages at the clutch housing via connection elements of the fastening device projects farther radially outward, encompassing the connection elements, than in the circumferential regions between two respective connection elements.

2. The clutch arrangement according to claim 1, wherein the axial central projection is fixedly connected to the clutch housing via a fastener.

3. The clutch arrangement according to claim 2, wherein at least one of the first connector, the second connector, and/or the fastener have connection elements that are detachable.

4. The clutch arrangement according to claim 2, wherein the rotor carrier has a plurality of recesses in circumferential direction at least at the side remote of the clutch housing.

5. The clutch arrangement according to claim 4, wherein the rotor carrier is formed in the circumferential region of the respective connection element of the, but radially outwardly thereof, with a recess in each instance.

6. The clutch arrangement according to claim 1, wherein the first connector provided between the drive unit and the axial central projection is detachable.

7. The clutch arrangement according to claim 6, wherein the first connector provided between the drive unit and the axial central projection comprises radial toothings at the axial central projection and at a torsional vibration damper.

8. The clutch arrangement according to claim 1, wherein the axial central projection is at the side of the fastening flange, remote of the clutch housing, with a support device for the rotor carrier, which has at least one support for the rotor carrier as well as at least one receptacle for at least one detachable connection element of the fastening device.

9. The clutch arrangement according to claim 1, arranged in a transmission housing having a cover, wherein the axial central projection is centered relative to the cover by a bearing device.

10. The clutch arrangement according to claim 9, wherein the axial central projection is sealed relative to the cover by a sealing device.

11. The clutch arrangement according to claim 1, wherein the clutch housing and/or the drive unit comprises a mass damper system.

12. The clutch arrangement according to claim 1, wherein the drive unit comprises a torsional vibration damper.

13. The clutch arrangement according to claim 1, wherein the rotor carrier axially is received axially between the radially outwardly extending fastening flange of the axial central projection and the clutch housing.

14. The clutch arrangement according to claim 1, wherein the radially outwardly extending fastening flange of the axial central projection receives the rotor carrier at its side remote of the clutch housing.

15. The clutch arrangement according to claim 1, wherein the radially outwardly extending fastening flange of the axial central projection has an at least substantially undulating outer contour in the radial circumferential region.

16. A clutch arrangement comprising:
a clutch housing configured to connect a drive unit to an output, the clutch housing is rotatable around a central axis;
an axial central projection arranged at a side of the clutch housing facing the drive unit in a radial extension area of clutch housing's rotational center;
a rotor carrier receiving a rotor of an electric machine received by the axial central projection;
a first connector that connects the axial central projection, at least to be fixed with respect to relative rotation, to the drive unit; and
a second connector that connects the axial central projection to the rotor carrier,
wherein the axial central projection comprises a radially outwardly extending fastening flange that connects the axial central projection to the clutch housing by connection elements of a fastening device,
wherein the axial central projection is at the side of the fastening flange, remote of the clutch housing, with a support device for the rotor carrier, which has at least one support for the rotor carrier as well as at least one receptacle for at least one detachable connection element of the fastening device,
wherein the support device for the rotor carrier is braces provided at a side of the radially outwardly extending fastening flange of the axial central projection remote of the clutch housing and which extend at least substantially radially outward proceeding from a hub of the axial central projection.

17. The clutch arrangement according to claim 16, wherein the braces run into a hub of the axial central projection with their radially inner end, respectively, and surround at least one receptacle for at least one connection element of the second connector radially outer end, respectively.

18. A clutch arrangement comprising:
a clutch housing configured to connect a drive unit to an output, the clutch housing is rotatable around a central axis;
an axial central projection arranged at a side of the clutch housing facing the drive unit in a radial extension area of clutch housing's rotational center;
a rotor carrier receiving a rotor of an electric machine received by the axial central projection;
a first connector that connects the axial central projection, at least to be fixed with respect to relative rotation, to the drive unit; and
a second connector that connects the axial central projection to the rotor carrier,
wherein the axial central projection is fixedly connected to the clutch housing via a fastener,
wherein the rotor carrier has a plurality of recesses in circumferential direction at least at the side remote of the clutch housing,
wherein the rotor carrier is formed in the circumferential region of the respective connection element of the fastening device, but radially inwardly thereof, with a recess in each instance.

* * * * *